(12) United States Patent
Nakamura

(10) Patent No.: US 8,124,265 B2
(45) Date of Patent: *Feb. 28, 2012

(54) POWER STORAGE DEVICE

(75) Inventor: Yoshiyuki Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 271 days.

This patent is subject to a terminal disclaimer.

(21) Appl. No.: 12/297,262

(22) PCT Filed: Dec. 20, 2007

(86) PCT No.: PCT/IB2007/004042
§ 371 (c)(1),
(2), (4) Date: Oct. 15, 2008

(87) PCT Pub. No.: WO2008/081280
PCT Pub. Date: Jul. 10, 2008

(65) Prior Publication Data
US 2009/0280399 A1 Nov. 12, 2009

(30) Foreign Application Priority Data
Dec. 21, 2006 (JP) .................. 2006-345067

(51) Int. Cl.
H01M 10/50 (2006.01)
H01M 6/04 (2006.01)
H01M 10/12 (2006.01)
H01M 4/02 (2006.01)
H01M 6/18 (2006.01)

(52) U.S. Cl. ........ 429/120; 429/126; 429/128; 429/209; 429/304; 429/305

(58) Field of Classification Search .................. 429/209, 429/234, 126, 120, 128, 304, 305
See application file for complete search history.

(56) References Cited

U.S. PATENT DOCUMENTS

| 5,959,830 | A | 9/1999 | Inagawa |
| 6,631,072 | B1 | 10/2003 | Paul |
| 6,887,620 | B2 | 5/2005 | Klein et al. |
| 7,803,486 | B2* | 9/2010 | Nakamura .................... 429/304 |
| 2006/0281007 | A1* | 12/2006 | Tsutsumi et al. ............. 429/246 |

FOREIGN PATENT DOCUMENTS

| EP | 0 570 590 A | 11/1993 |
| JP | 03-266371 A | 11/1991 |

(Continued)

OTHER PUBLICATIONS

Machine translation of JP 2001-015146, Jan. 2001.*

(Continued)

*Primary Examiner* — Patrick Ryan
*Assistant Examiner* — Julian Anthony
(74) *Attorney, Agent, or Firm* — Kenyon & Kenyon LLP

(57) ABSTRACT

A power storage device includes: an electrolyte layer; and an electrode consisted of a current collecting portion and an electrode layer, wherein the thickness of the electrolyte layer is larger at a first position in a plane perpendicular to the stacking direction than at a second position where the heat radiation is higher than at the first position, and the thickness of the current collecting portion is smaller at a position corresponding to the first position than at a position corresponding to the second position.

14 Claims, 7 Drawing Sheets

FOREIGN PATENT DOCUMENTS

| | | | |
|---|---|---|---|
| JP | 09-199177 A | 7/1997 | |
| JP | 10-003938 A | 1/1998 | |
| JP | 10-149820 A | 6/1998 | |
| JP | 2000-348756 A | 12/2000 | |
| JP | 2001-015146 A | 1/2001 | |
| JP | 2004-139775 A | 5/2004 | |
| JP | 2004-253155 A | 9/2004 | |
| JP | 2004-273132 A | 9/2004 | |
| JP | 2005-011660 A | 1/2005 | |
| JP | 2005-038612 A | 2/2005 | |
| JP | 2005-071784 A | 3/2005 | |
| JP | 2005-174691 A | 6/2005 | |
| JP | 2005-340089 A | 12/2005 | |
| JP | 2006-173095 A | 6/2006 | |
| WO | WO 2008/010564 A1 | 1/2008 | |
| WO | WO 2008-053830 A1 | 5/2008 | |

OTHER PUBLICATIONS

Office Action issued on Jun. 23, 2011 in U.S. Appl. No. 12/373,547.

\* cited by examiner

PERIPHERY   CENTER   PERIPHERY

POWER STORAGE DEVICE

This is a 371 national phase application of PCT/IB2007/004042 filed 20 Dec. 2007, claiming priority to Japanese Patent Application No. 2006-345067 filed 21 Dec. 2006, the contents of which are incorporated herein by reference.

BACKGROUND OF THE INVENTION

1. Field of the Invention

The invention relates to power storage devices (e.g., secondary batteries) having electrolyte layers.

2. Description of the Related Art

Secondary batteries are widely used as the power source for various mobile electronic devices including laptop computers and mobile phones, and secondary batteries are also used as the power source for the power plant of electric vehicles, or the like. With regard to such secondary batteries, various technologies have been proposed to suppress the deterioration of the battery performance due to the variation of the thermal conditions (For example, refer to Japanese patent application publication No. 2006-173095 (JP-A-2006-173095) (Para. 0008 to 0011, Para. 0015-0022, FIG. 1, etc) and Japanese patent application publication No. 2005-340089 (JP-A-2005-340089) (Para. 0029 to 0032, FIG. 3, etc)).

JP-A-2006-173095 describes a battery unit constituted of a plurality of battery cells stacked on top of each other. The heat radiation of this battery unit is improved by setting the lengths of the short sides of each electrode, the area of the electrode, and the thickness of the battery unit so as to satisfy a given relational expression.

JP-A-2005-340089 describes a bipolar battery in which, in order to improve the heat radiation, at least one of the thickness of a positive active material layer and the thickness of a negative active material layer is made smaller than the thickness of the separators.

However, the structure of the battery unit described in JP-A-2006-173095 does not address the issue of the heat radiation of each battery cell. Therefore, the heat radiation from each battery cell may be insufficient and it may make the temperature distribution in each battery cell uneven.

Further, in the bipolar battery described in JP-A-2005-340089, the thickness of the active material layers and the thickness of the separators are uniform, the temperature distribution in a plane perpendicular to the direction in which the components of the bipolar battery are stacked (will be referred to as "stacking direction) is uneven. That is, in a bipolar battery constituted of a plurality of bipolar electrodes stacked with electrolyte layers interposed in-between, there exist regions having different heat radiations in planes perpendicular to the stacking direction. For example, in some cases, the heat radiation at the region located at the center in a plane perpendicular to the stacking direction is lower than the heat radiation at the region at the periphery in the same plane.

In such bipolar batteries, if the separators, etc., have a uniform thickness, it is difficult to minimize the unevenness of the temperature distribution due to the heat radiation differences mentioned above.

SUMMARY OF THE INVENTION

The invention provides a power storage device that is adapted to minimize the unevenness of the temperature distribution in a plane perpendicular to the direction in which the components of the power storage device are stacked.

A first aspect of the invention relates to a power storage device having: an electrolyte layer; and an electrode constituted of a current collecting portion and an electrode layer, wherein the thickness of the electrolyte layer is larger at a first position in a plane perpendicular to a stacking direction in which components of the power storage device are stacked than at a second position at which the heat radiation is higher than at the first position, and the thickness of the current collecting portion is smaller at a position corresponding to the first position than at a position corresponding to the second position.

In the above-described power storage device, the thickness of the electrode layer at a position corresponding to the first position and the thickness of the electrode layer at a position corresponding to the second position may be substantially equal to each other. In this case, the difference between the thickness of the electrolyte layer at the first position and the thickness of the electrolyte layer at the second position may be made substantially equal to the difference between the thickness of the current collecting portion at the position corresponding to the first position and the thickness of the current collecting portion at the position corresponding to the second position.

Further, the thickness of the electrode layer at the position corresponding to the first position may be made smaller than the thickness of the electrode layer at the position corresponding to the second position. In this case, the difference between the thickness of the electrolyte layer at the first position and the thickness of the electrolyte layer at the second position may be made substantially equal to the difference between the thickness of the electrode (i.e., the current collecting portion and the electrode layer) at the position corresponding to the first position and the thickness of the electrode at the position corresponding to the second position.

Further, the first position may be a position corresponding to substantially the center of the electrolyte layer, and the second position may be a position corresponding to the periphery of the electrolyte layer.

Further, the thickness of the electrolyte layer may increase continuously, or in steps, from the second position to the first position, and the thickness of the current collecting portion may decrease continuously, or in steps, from the second position to the first position.

Further, the thickness of the electrode layer may decrease continuously, or in steps, from the second position to the first position. The electrolyte layer may be a solid electrolyte layer.

In the power storage device described above, further, the electrode layer may have a region with no electrode layer in a plane perpendicular to the stacking direction. Further, the electrolyte layer may have a region with no electrolyte layer which is located at a position corresponding the region with no electrode layer.

In the power storage device described above, the electrode and the electrolyte layer may be provided in plurality, and the plurality of electrodes may be stacked in a manner such that each pair of the electrodes interposes one of the plurality of electrolyte layers therebetween. And the thickness of at least one of the electrolyte layers may be larger than the thickness of the other of the electrolyte layers.

According to the power storage device described above, because the thickness of the electrolyte layer varies according to the position in the plane perpendicular to the stacking direction (the first position and the second position), the unevenness of the temperature distribution in the same plane can be minimized. More specifically, because the thickness of the electrolyte layer at the first position is larger than the thickness of the electrolyte layer at the second position at which the heat radiation is higher than that at the first position, the increase of the temperature at the first position is suppressed, whereby the unevenness of the temperature distribution between the first position and the second position is minimized.

Further, in the power storage device described above, the thickness of the power collecting portion is relatively small at the position corresponding to the larger thickness portion of the electrolyte layer (the first position) and is relatively large at the position corresponding to the smaller thickness portion of the electrolyte layer (the second position). According to this structure, the non-uniformity of the thickness in the power storage device can be minimized.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Hereinafter, example embodiments of the invention will be described.

Figure 1:
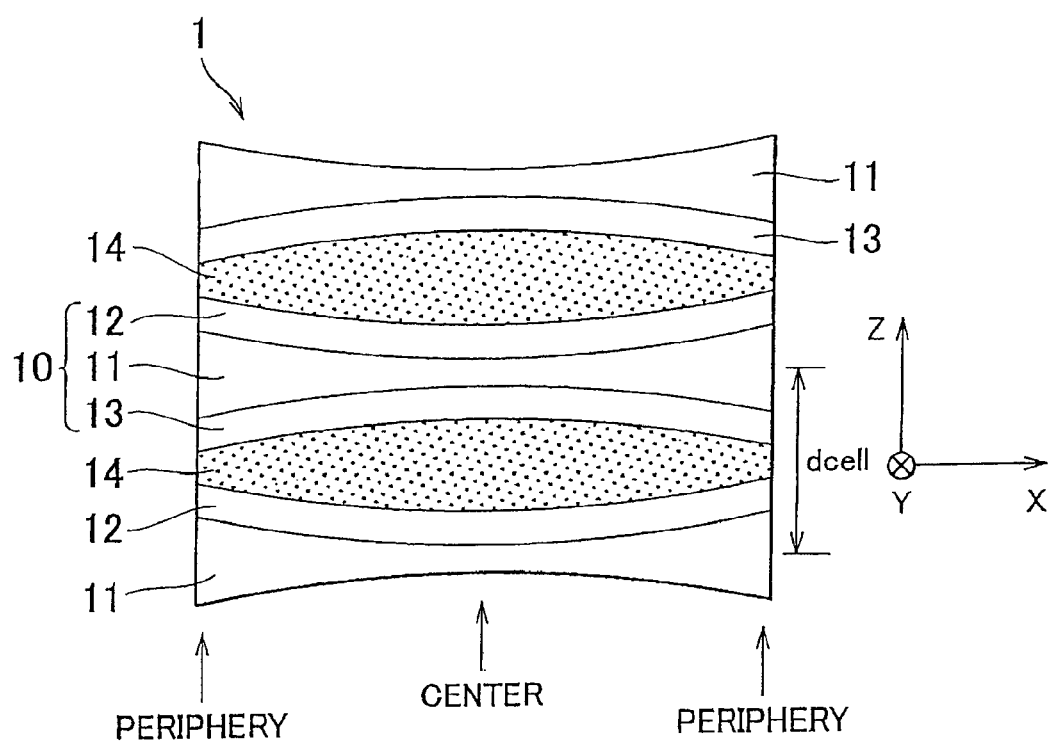
FIG. 1 is a cross-sectional view of a bipolar battery according to the first example embodiment of the invention.
Figure 2:
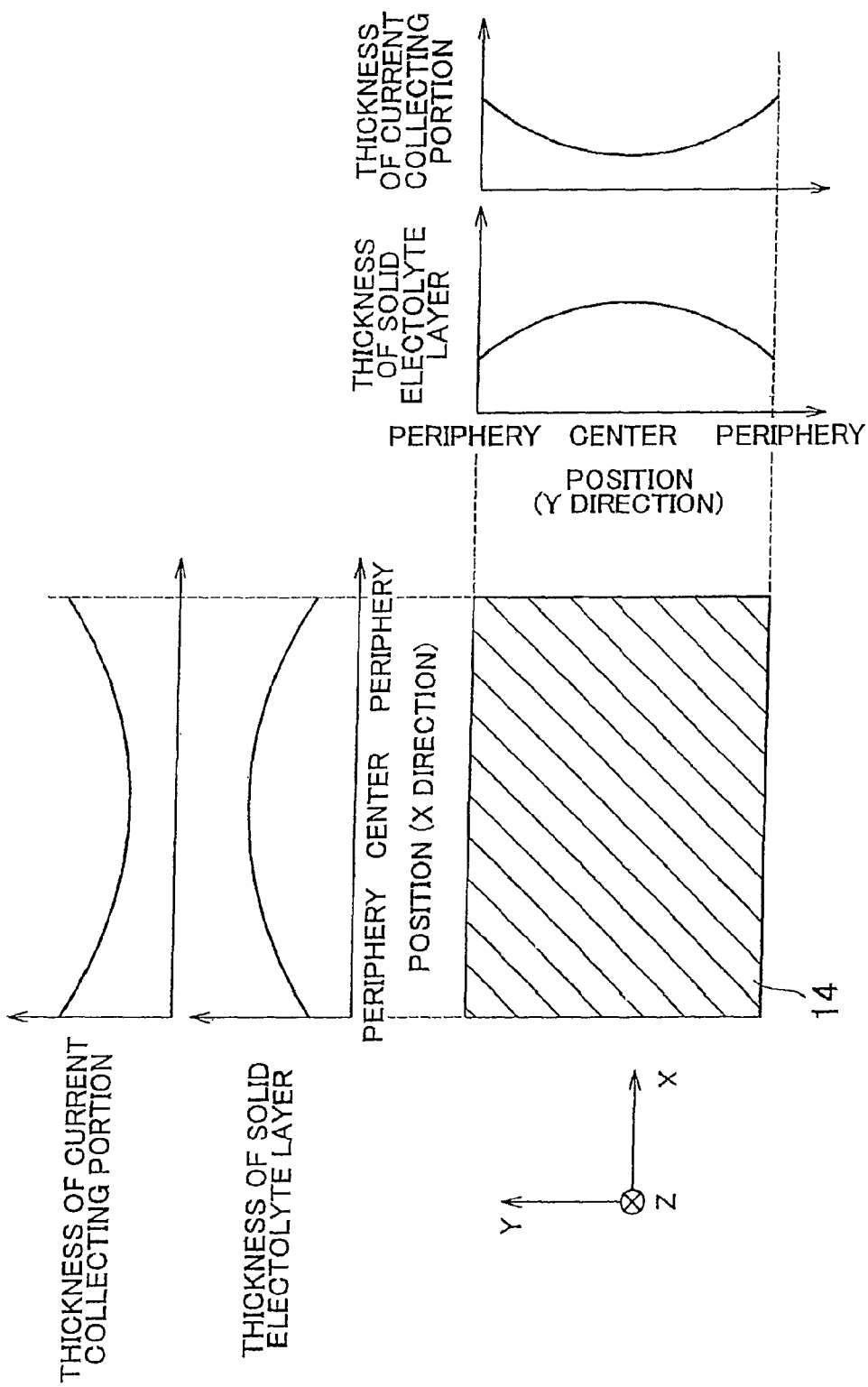
FIG. 2 are charts indicating the thickness of the solid electrolyte layer and the current collecting portion at each position in the X-Y plane.

First, a bipolar battery (secondary battery) according to the first example embodiment of the invention will be described with reference to FIG. 1 and FIG. 2. FIG. 1 is a cross-sectional view of the bipolar battery of the first example embodiment (a portion of the same bipolar battery) which is used as a power storage device. FIG. 2 are a plan view of a solid electrolyte layer incorporated in the bipolar battery of the first example embodiment, charts indicating the thickness of the solid electrolyte layer at each position, and charts indicating the thickness of a current collecting portion at each position.

Referring to FIG. 1, the bipolar battery 1 of the first example embodiment is constituted of a plurality of bipolar electrodes ("electrodes") 10 that are stacked on top of each other with solid electrolyte layers 14 interposed in between.

It is to be noted that while the invention has been applied to the bipolar type secondary battery 1 in the first example embodiment, the invention can be applied to various other secondary batteries, such as batteries with electrodes in which the same electrode layers (positive electrode layers or negative electrode layers) are formed on the both sides of each current collecting portion and batteries with electrodes in which an electrode layer is formed only on one side of each current collecting portion.

Further, as well as secondary batteries, the invention can be also applied to multi-layered capacitors (electric double-layer capacitors) that are used as power storage devices.

Referring to FIG. 1, the current collecting portion 11 is provided in each bipolar electrode 10 as a base portion. A positive electrode layer 12 and a negative electrode layer 13 are formed on the sides of each current collecting portion 11 in the stacking direction (i.e., the sides of each current collecting portion 11 on X-Y planes), respectively.

Referring to FIG. 2, the thickness of each current collecting portion 11 (the length of the current collecting portion 11 in the Z direction) varies according to the position in the X direction and to the position in the Y direction. More specifically, as viewed in the X direction and the Y direction, the thickness of the current collecting portion 11 is smallest at the center and largest at the periphery, and it continuously increases from the center to the periphery.

That is, as shown in FIG. 1, the both sides of each current collecting portion 11 in the stacking direction (the surfaces on which the electrode layers 12, 13 are formed, respectively) are curved. The current collecting portions 11 are formed by applying a given material by the ink-jet application method, or the like, or by pressing a given material. The method for forming the current collecting portions 11 is not limited to these methods, That is, any methods can be used as long as each current collecting portion 11 can be formed in the shape described in this specification.

The bipolar battery 1 is an assembled battery constituted of a plurality of battery cells stacked on top of each other. A positive electrode tub and a negative electrode tub (not shown in the drawings) are formed at the both ends of the bipolar battery 1 in the stacking direction (Z direction).

Each battery cell of the bipolar battery 1 is a power generation element constituted of the solid electrolyte layer 14 and the electrode layers 12, 13 provided on the solid electrolyte layer 14. The positive electrode tub and the negative electrode tub of the bipolar battery 1 are electrically, and mechanically, connected to the current collecting portions 11 located at the both ends of the bipolar battery 1 in the stacking direction, respectively. The faces of these end current collecting portions 11 that contact the positive electrode tub and the negative electrode tub, respectively, are generally flat, not being curved. However, the contact faces of these end current collecting portions 11 may be curved. In this case, the positive electrode tub and the negative electrode tub are arranged along the respective contact faces of the end current collecting portions 11.

The thickness of the positive electrode 12 on each current collecting portion 11 is substantially uniform (including production tolerances). Likewise, the negative electrode layer 13 on each current collecting portion 11 is substantially uniform (including production tolerances). Thus, because the both sides of the current collecting portion 11 are curved as described above, the surfaces of each electrode layer 12, 13 formed on the current collecting portion 11 are curved naturally. That is, the surface of the positive electrode layer 12 on one side in the stacking direction is concave, while the surface on the other side in the stacking direction is convex. Likewise, the surface of the negative electrode layer 13 on one side in the stacking direction is concave, while the surface on the other side in the stacking direction is convex.

The electrode layers 12, 13 are formed on each current collecting portion 11 using the ink-jet material application method, or the like.

Each current collecting portion 11 is formed of, for example, aluminum foils or a plurality of metals (alloys). Alternatively, each current collecting portion 11 may be formed by coating aluminum on the surface of metal (excluding aluminum).

Further, so-called composite current collecting portions each formed by laminating a plurality of metal foils may be used as the current collecting portions 11. In this case, for example, the current collecting portions for the positive electrodes are made of aluminum, or the like, while the current collecting portions for the negative electrodes are made of nickel, copper, or the like. The composite current collecting portions may be formed, for example, such that the current collecting portions for the positive electrodes and the current collecting portions for the negative electrodes directly contact each other or such that conductive layers are formed between the current collecting portions for the positive electrodes and the current collecting portions for the negative electrodes, respectively.

Each positive electrode layer 12 contains a positive electrode active material, and each negative electrode layer 13 contains a negative electrode active material. Further, the electrode layers 12, 13 may contain conductive additives, binders, inorganic electrolytes for increasing the ion conductivity, polymer gel electrolyte, polymer electrolytes, various additives, and so on, as needed. The electrode layers 12, 13 may be made of known materials.

For example, in nickel-hydrogen batteries, nickel oxide is used as the active material for the positive electrode layers 12, and hydrogen-adsorbed alloy, such as $MmNi_{(5-x-y-z)}Al_xMn_y$-$Co_z$(Mm: misch metal), or the like, may be used as the active material for the negative electrodes 13. Further, in the case of lithium secondary batteries, lithium-transition metal compound oxide may be used as the active material for the positive electrodes 12, and carbon may be used as the active material for the negative electrodes 13. Further, acetylene black, carbon block, graphite, carbon fibers, and carbon nanotubes may be used as conductive additives.

Meanwhile, the solid electrolyte layer 14 is provided between each two bipolar electrodes 10 that are adjacent to each other in the stacking direction (Z direction). More specifically, each solid electrolyte layer 14 is sandwiched between the positive electrode layer 12 of one of the two adjacent the bipolar batteries 10 and the negative electrode layer 13 of the other bipolar electrode 10.

Further, referring to FIG. 2, the thickness of each solid electrolyte layer 14 varies according to the position in the X direction and to the position in the Y direction. More specifically, as viewed in the X direction, the thickness of the solid electrolyte layer 14 (the length of the solid electrolyte layer 14 in the Z direction) is largest at the center and smallest at the periphery, and it continuously decreases from the center to the periphery. Likewise, as viewed in the Y direction, the thickness of the solid electrolyte layer 14 is largest at the center and smallest at the periphery, and it continuously decreases from the center to the periphery.

As such, the surfaces of each solid electrolyte layer 14 (the surfaces that contact the electrode layers 12, 13, respectively) are convex (curved) having a certain curvature.

In this example embodiment, because the thickness of each solid electrolyte layer 14 continuously decreases from the center to the periphery and the thickness of each current collecting portion 11 continuously increases from the center to the periphery as described above, the non-uniformity of the thickness of each battery cell (Refer to "dcell" in FIG. 1) in a plane perpendicular to the stacking direction (X-Y plane) can be minimized. Note that the thickness of each battery cell ("dcell") is defined as the distance between the centers of the two current collecting portions 11 that are adjacent to each other across the battery cell as shown in FIG. 1.

In this example embodiment, the thickness of each current collecting portion 11 varies so as to compensate for the variation of the thickness of each solid electrolyte layer 14. That is, the amount of variation of the thickness of each solid electrolyte layer 14 and the amount of variation of the thickness of each current collecting portion 11 are substantially equal to each other, and thus the thickness of each battery cell is substantially uniform. Note that "the amount of variation of the thickness" refers to the difference in thickness between two arbitrary points in the X-Y plane.

Each solid electrolyte layer 14 contains particle groups consisting of a plurality of particles and binders for binding the particle groups. For example, the solid electrolyte layers 14 may be made of inorganic solid electrolyte or solid polymer electrolyte.

Examples of inorganic solid electrolyte that can be used to form the solid electrolyte layers 14 include Li nitrides, halides, oxy-salts, and phosphorus compound sulfides. More specifically, the following substances may be used: $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$, $Li_2SiS_3$, $Li_2O$—$B_2O_3$, $Li_2O_2$—$SiO_2$, $Li_2S$—$GeS_4$, $Li_2S$—$P_2S_5$, and $LiI$—$Li_2S$—$P_2S_5$.

On the other hand, examples of solid polymer electrolyte that can be used to form the solid electrolyte layers 14 include substances constituted of any of the electrolytes listed above and polymers that perform dissociation of electrolytes and substances having polymers with ion-dissociable groups. Examples of polymers that perform dissociation of electrolytes include polyethylene oxide derivatives, polymers having polyethylene oxide derivatives, polypropylene oxide derivatives, polymers having polypropylene oxide derivatives, and ester phosphate polymers. Note that inorganic solid electrolyte and solid polymer electrolyte may be used in combination.

In the case of lithium secondary batteries, if sulfides are used as the material of the solid electrolyte layers 14, the lithium-ion conductivity of the solid electrolyte layers 14 improves. Examples of such sulfides include lithium sulfides and silicon sulfides.

While the first example embodiment has been applied to the case in which the solid electrolyte layers 14 are used, the invention is not limited to this. That is, for example, non-woven fabrics soaked with electrolytic solution may be used as separators (electrolyte layers). In this case, more specifically, a plurality of non-woven fabrics that are different in dimensions (size) from each other are stacked on top of each other so that a separator having a thickness that varies according to the position in the X-Y plane is formed. The use of the separators thus formed provides the same effects as those obtained in the case where the solid electrolyte layers 14 of the first example embodiment are used.

In the case where an electrolytic solution is used as above, it is necessary to apply sealant between the current collecting portions that are adjacent to each other in the stacking direction (around each battery cell) in order to prevent the electrolytic solution from leaking to the outside of the battery cell.

In this example embodiment, the thickness of each solid electrolyte layer 14 is set based on, for example, the temperature distribution (the temperature distribution in the X-Y plane) of a conventional bipolar battery. The "conventional bipolar battery" refers to a battery constituted of solid electrolyte layers having a substantially uniform thickness and bipolar electrodes having a substantially uniform thickness.

Figure 3:
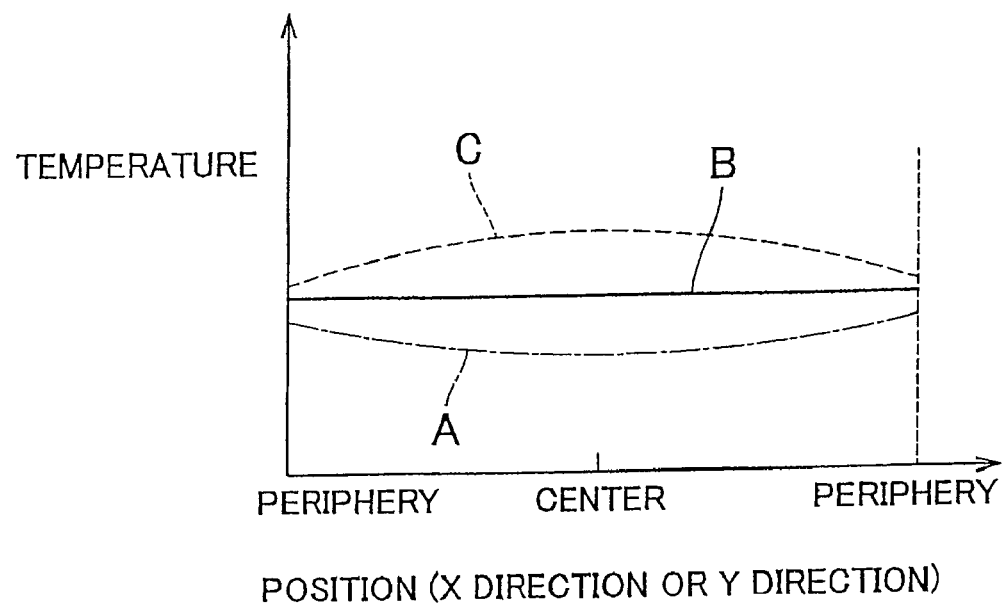
FIG. 3 is a chart illustrating the temperature distribution in the bipolar battery.

FIG. 3 indicates the temperature of the bipolar battery 1 (battery cell) at each position in the X direction (or the Y direction). In FIG. 3, the vertical axis represents the temperature in the battery cell, and the transverse axis represents the position in the X direction (or the Y direction).

The dashed curve C in FIG. 3 represents the temperature distribution in a conventional bipolar battery (battery cell). As indicated by the temperature distribution curve C, the temperature of the conventional bipolar battery is highest at the center and it decreases toward the periphery. That is, heat tends to remain at the center of the battery cell, and the heat transfer (heat radiation) from the center of the battery cell to the outside is relatively weak. Thus, the temperature at the center of the battery cell is relatively high as compared to at other portions.

In the case where the temperature is uneven in the X-Y plane (i.e., the plane perpendicular to the stacking direction) as indicated by the temperature distribution curve C in FIG. 3, the performance of the bipolar battery tends to deteriorate.

In view of this, in the first example embodiment, each solid electrolyte layer 14 is formed such that its thickness varies in the X-Y plane. More specifically, the thickness of each solid electrolyte layer 14 is larger at the center than at the periphery.

Due to the solid electrolyte layers 14 thus formed, the current density at the large-thickness portion of each solid electrolyte layer 14 (the center portion) is relatively low and therefore the amount of heat that is generated at the same portion through the charging and discharging of the bipolar battery 1 is relatively small.

In the case where the solid electrolyte layers 14 are formed such that the thickness of each solid electrolyte layer 14 is larger at the center than at the periphery, the moving paths for ions (e.g., lithium ions if the battery is a lithium secondary battery) at the center of the solid electrolyte layer 14 are restricted and therefore the current at the center of the solid electrolyte layer 14 decreases. Further, the larger thickness at the center of the solid electrolyte layer 14 provides a higher resistance.

In general, the amount of energy consumed as heat is proportional to the square of the current and to the resistance. Therefore, the amount of energy consumed as heat largely depends on the current. According to the structure of the solid electrolyte layers 14 of the first example embodiment, as mentioned above, the current is relatively small and the resistance is relatively high at the center of each solid electrolyte layer 14. Thus, due to the small current, heat generation at the center of the solid electrolyte layer 14 can be effectively suppressed.

That is, by suppressing the heat generation at the center of each solid electrolyte layer 14 as described above, the unevenness of the temperature distribution in the bipolar battery 1 in the X-Y plane can be minimized.

The single-dotted curve A in FIG. 3 represents the temperature distribution in the bipolar battery 1 in the early stage of its operation. As indicated by the temperature distribution curve A, in the early operation stage, the temperature of the solid electrolyte layer 14 is lower at the center than at the periphery because the thickness of the solid electrolyte layer 14 is larger at the center than at the periphery.

However, the temperature distribution in the solid electrolyte layer 14 in the X-Y plane changes in time from the state indicated by the temperature distribution curve A (single-dotted curve) to the state indicated by the solid line B in FIG. 3.

That is, because the heat radiation at the center of the bipolar battery 1 (battery cell) is weak as compared to at other portions, the temperature increase at the center of the bipolar battery 1 is relatively gentle. Thus, by setting the thickness of the solid electrolyte layers 14 located at the center of the bipolar battery 1 in advance in consideration of such a temperature increase characteristic at the center of the bipolar battery 1, the temperature distribution in the bipolar battery 1 (battery cell) in the X-Y plane can be made substantially even. Preferably, the bipolar battery 1 of the first example embodiment is used in the temperature distribution state indicated by the solid line B in FIG. 3.

Figure 4:
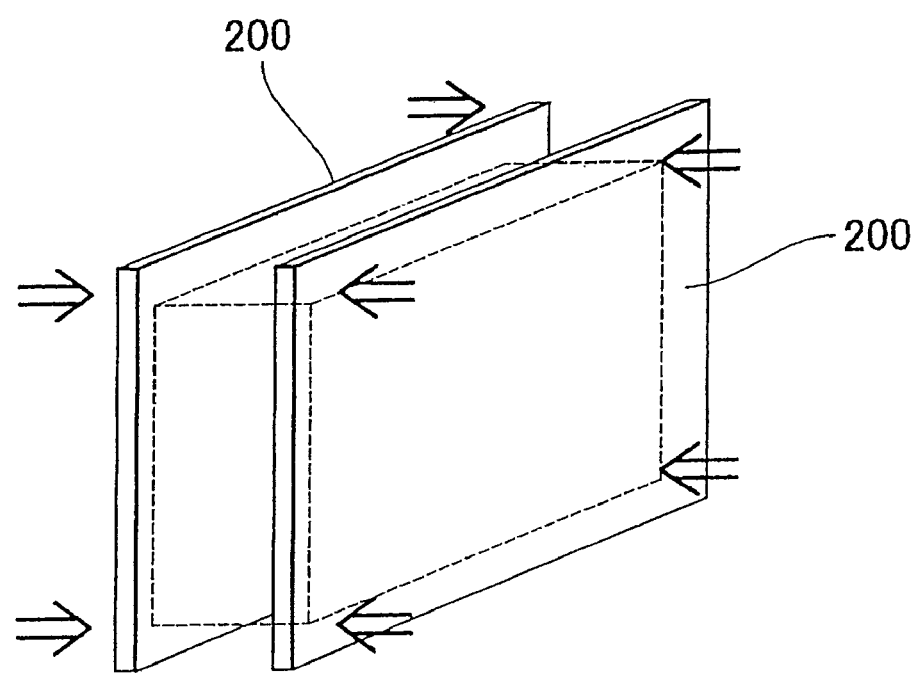
FIG. 4 is a perspective view showing the clamping structure of the bipolar battery.

Meanwhile, in the first example embodiment, the bipolar battery 1 is sandwiched between clamp members 200 from both sides in the stacking direction as shown in FIG. 4 in order to suppress the thermal expansion of the bipolar battery 1 that occurs through the charging and discharging of the bipolar battery 1, or the like. More specifically, the bipolar battery 1 is clamped at the periphery as indicated by the arrows in FIG. 4.

According to this structure, although it is possible to suppress the thermal expansion at the periphery of the bipolar battery 1, the thermal expansion at the center of the bipolar battery 1 can not be suppressed, and therefore only the center of the bipolar battery 1 may be displaced due to the thermal expansion.

In the bipolar battery 1 of the first example embodiment, however, because the unevenness of the temperature distribution in the X-Y plane is minimized as described above, the thermal expansion at the center of the bipolar battery 1 can be suppressed. Accordingly, even if the structure shown in FIG. 4 is employed, the displacement of the center of the bipolar battery 1 due to the thermal expansion can be prevented.

According to the first example embodiment, further, because the thickness of each battery cell is substantially uniform as mentioned earlier, it is possible to apply a substantially even pressure to the entire surface of the bipolar battery 1.

Meanwhile, while each solid electrolyte layers 14 are formed such that their thickness continuously vary in both the X direction and the Y direction as shown in FIG. 3 in the first example embodiment, the solid electrolyte layers 14 may alternatively be formed such that their thickness vary only in one of the X direction and the Y direction. In this case, too, the current collecting portions 11 are formed such that their thickness vary so as to compensate for the variation of the thickness of the solid electrolyte layers 14. As such, the unevenness of the temperature distribution in the direction in which the thickness of the solid electrolyte layers 14 vary (X direction or Y direction) can be minimized.

Further, while the electrode layers 12, 13 are formed on substantially the enter surface of the current collecting portion 11 (Refer to FIG. 1) in the first example embodiment, the electrode layers 12, 13 may alternatively be formed such that there is a region or regions on the current collecting portion 11 where no electrode layer is formed. In the following, this structure will be described in detail as a modification example of the first example embodiment with reference to FIG. 5 and FIG. 6.

Figure 5:
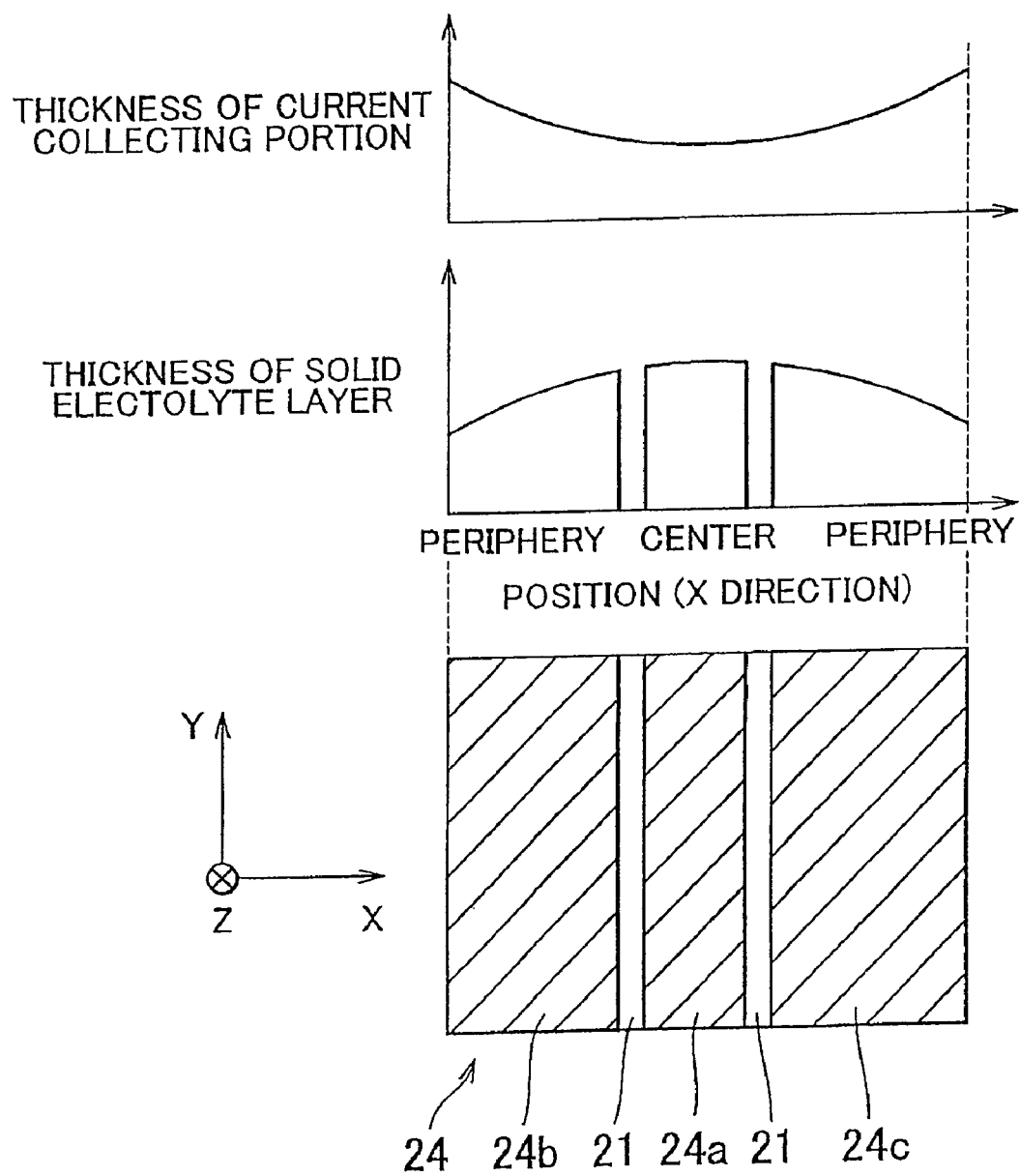
FIG. 5 is a chart indicating the thickness of the solid electrolyte layer of the bipolar battery of the modification example of the first example embodiment at each position in the X-Y plane.
Figure 6:
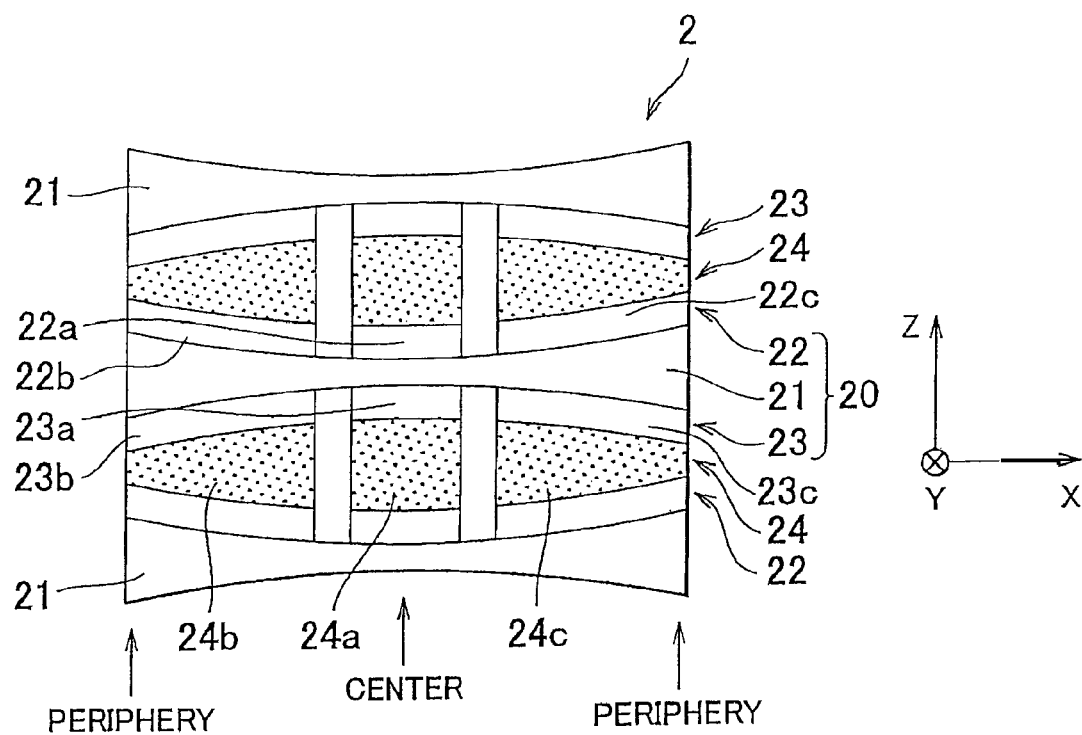
FIG. 6 is a cross-sectional view of a bipolar battery of the modification example of the first example embodiment.

FIG. 5 are a plan view of a solid electrolyte layer incorporated in a bipolar battery according to this modification example of the first example embodiment and a chart indicating the thickness of the solid electrolyte layer at each position (the position in the X direction), and FIG. 6 is a side view of the bipolar battery of the modification example.

Referring to FIG. 6, a positive electrode layer 22 and a negative electrode layer 23 are formed on the both sides of each current collecting portion 21, respectively. The positive electrode layer 22 and the negative electrode layer 23 each have three regions described below.

On one side of the current collecting portion 21 in the stacking direction, a first positive electrode layer 22a is formed at the center and a second positive electrode layer 22b and a third positive electrode layer 22c are formed on the both sides of the first positive electrode layer 22a in the X direction, respectively. Between the first to third positive electrode layers 22a to 22c are regions where no positive electrode layer is formed. Note that the first to third positive electrode layers 22a to 22c are made of a common material.

Likewise, on the other side of the current collecting portion 21 in the stacking direction, a first negative electrode layer 23a is formed at the center and a second negative electrode layer 23b and a third negative electrode layer 23c are formed on the both sides of the first negative electrode layer 23a in the X direction, respectively. Between the first to third negative electrode layers 23a to 23c are regions where no negative electrode layer is formed. Note that the first to third negative electrode layers 23a to 23c are made of a common material.

The solid electrolyte layer 24 is formed only in the regions corresponding to the regions where the electrode layers 22, 23 are formed. More specifically, a first solid electrolyte layer 24a is formed between the first positive electrode layer 22a and the first negative electrode layer 23a, a second solid electrolyte layer 24b is formed between the second positive electrode layer 22b and the second negative electrode layer 23b, and a third solid electrolyte layer 24c is formed between the third positive electrode layer 22c and the third negative electrode layer 23c.

Referring to FIG. 5, the thickness of the first solid electrolyte layer 24a is largest at the center in the X direction and it continuously decreases toward the periphery (i.e., toward the second solid electrolyte layer 24b and toward the third solid electrolyte layer 24c). The thickness of the second solid electrolyte layer 24b is largest in the side close to the center of the solid electrolyte layer 24 (i.e., the side close to the first solid electrolyte layer 24a) and it continuously decreases toward the periphery. Likewise, the thickness of the third solid electrolyte layer 24c is largest in the side close to the center of the solid electrolyte layer 24 (i.e., the side close to the first solid electrolyte layer 24a) and it continuously decreases toward the periphery. Note that the thickness of the thickest portion of the second solid electrolyte layer 24b and the thickness of the thickest portion of the third solid electrolyte layer 24c are smaller than the thickness of the thinnest portion of the first solid electrolyte layer 24a.

According to this modification example, as such, the regions (spaces) with no electrode layer and no solid electrolyte layer are provided, and therefore the heat generated in the bipolar battery 2 can be efficiently released to the outside via these regions. In particular, because the temperature at the center in the X-Y plane tends to rise up to the highest level, if regions with no electrode layer are provided near the center in the X-Y plane, the heat in the bipolar battery 2 (battery cell) can be efficiently released.

Further, because the thickness of each electrolyte layer 24a to 24c varies according to the position in the X direction, the unevenness of the temperature distribution in the X direction can be minimized.

While each solid electrolyte layer 24 is separately formed in the regions where the electrode layers 22, 23 are formed in this modification example, the solid electrolyte layer 24 may be a single layer as it is in the first example embodiment described above, because it reduces the possibility that each adjacent current collecting portions 21 deform and contact each other under external forces.

Further, while the electrode layers 22, 23, etc., are not formed in two regions in this modification example, the invention is not limited to this. That is, the number of the regions with no electrode layers is arbitral. The larger the number of the regions with no electrode layers, the lower the energy efficiency of the bipolar battery 2. To cope with this issue, the number of the regions with no electrode layers may be set to the minimum necessary number.

While the solid electrolyte layers and the current collecting portions are formed such that their thickness vary continuously in the foregoing example embodiment and modification example, they may alternatively be formed such that their thickness vary in steps. For example, the solid electrolyte layers and the current collecting portions may be formed such that their thickness vary in steps along the curves in the charts in FIG. 2 illustrating the thickness of each solid electrolyte layer and the thickness of each current collecting portion, respectively. In this case, too, the unevenness of the temperature distribution in the bipolar battery (battery cell) in the X-Y plane can be minimized while minimizing the non-uniformity of the thickness in the battery cell.

Further, as described above, the first example embodiment and the modification example employ structures in which the thickness of each single solid electrolyte layer varies according to the position in the X-Y plane. Other than this, in the case of an assembled battery constituted of a plurality of battery cells stacked on top of each other, each solid electrolyte layer may be formed so as to have a different thickness according to where it is located in the stacking direction.

In general, in a bipolar battery having a stack structure, the heat radiation at the center of the bipolar battery in the stacking direction and the heat radiation at the outer side of the bipolar battery in the stacking direction are different from each other. Therefore, it is often the case that the temperature distribution (temperature distribution in the stacking direction) is different at each battery cell. To cope with this, one option is to set the thickness of each solid electrolyte layer differently according to its position in the stacking direction. By doing so, the unevenness of the temperature distribution in the stacking direction can be suppressed. It is to be noted that, in this case, too, the structure of each solid electrolyte layer is the same as the above-described structure (Refer to FIG. 1), that is, the thickness of each solid electrolyte layer is larger at the center of the solid electrolyte layer than at the periphery.

Namely, in the above case, in order to minimize the unevenness of the temperature distribution in the stacking direction of the bipolar battery, the thickness of the solid electrolyte layer or layers located at the center of the bipolar battery in the stacking direction is larger than the thickness of the solid electrolyte layers located at the outer sides of the bipolar battery in the stacking direction.

Further, it is also possible to use the solid electrolyte layers of the first example embodiment or the solid electrolyte layers of the modification example (i.e., the solid electrolyte layers having a non-uniform thickness in its plane direction) as the solid electrolyte layers at the center of the battery and use the conventional solid electrolyte layers as the solid electrolyte layers at the outer sides of the battery.

In the first example embodiment and the modification example, the non-uniform thickness of each solid electrolyte layer is set in accordance with the heat radiation characteristic of the bipolar battery. However, in the case where the causes of the unevenness of the temperature distribution in the X-Y plane include external thermal influences, the non-uniform thickness of each solid electrolyte layer may be set by factoring in such external thermal influences. This will be described in more detail below.

For example, in the case where there is a heat source (e.g., engine, motor) near the bipolar battery, the heat source thermally influences the bipolar battery. Therefore, the temperature of the heat source side region of the bipolar battery tends to be higher than the temperatures at other regions (That is, the heat radiation at the heat source side region of the bipolar battery deteriorates as compared to those at other regions).

Such a temperature distribution unevenness in the X-Y plane, however, can be minimized by forming each solid electrolyte layer such that the thickness of the heat source side portion of the solid electrolyte layer is larger than the thickness of other portions. That is, as in the first example embodiment described above, due to the thickness of the solid electrolyte layer varying according to the position in the X-Y plane, the current density varies according to the position in the X-Y plane, and it minimizes the unevenness of the temperature distribution in the bipolar battery (battery cell).

Thus, the thickness of each solid electrolyte layer can be set in advance by taking into consideration the X-Y plane temperature distribution characteristic reflecting the thermal influences from the heat source (which can be estimated in advance). Further, in the case where the thickness of each solid electrolyte layer is set as described above, each current collecting portion is formed such that its thickness varies according to the variation of the thickness of the corresponding solid electrolyte layer as it is in the first example embodiment. That is, the thickness of each current collecting portion varies so as to minimize the non-uniformity of the thickness in the battery cell.

For example, in addition to or in place of the solid electrolyte layer structure of the first example embodiment, the following structure may be employed. That is, the thickness of the heat source side portion of the solid electrolyte layer (e.g., the outer portion on one side in the X direction) is made larger than other portions (e.g., the outer portion on the other side in the X direction). This minimizes the unevenness of the temperature distribution in the X-Y plane due to the heat generation caused by the charging and discharging of the bipolar battery and the external thermal influences.

In the case where the temperature of the solid electrolyte layer is highest at the heat source side portion (the heat radiation of the solid electrolyte layer is lowest at the heat source side portion), the solid electrolyte layer may be formed such that its thickness is largest at the heat source side portion.

On the other hand, in the case where the bipolar battery is an assembled battery constituted of battery cells stacked on top of each other as shown in FIG. 1 and there is a heat source on one side of the bipolar battery in the stacking direction, the battery cells located on the heat source side are more likely to be thermally influenced by the heat source. To cope with this issue, one option is to make the structures of the solid electrolyte layers of the battery cells located on the heat source side different from the structures of the solid electrolyte layers of the battery cells located on the side opposite from where the heat source is located.

More specifically, the thickness of the solid electrolyte layer(s) located on the heat source side (the outermost region on one side in the stacking direction) is made larger than the thickness of other solid electrolyte layers (e.g., the solid electrolyte layers located in the outermost region on the other side in the stacking direction). That is, the multiple solid electrolyte layers are formed such that the thickness of the layers in one region is different from the thickness of the layers in other region(s).

For example, the thickness of the solid electrolyte layers located in the center of the bipolar battery in the stacking direction may be made larger than the thickness of other solid electrolyte layers. According to this structure, when a bipolar battery having a stack structure is thermally influenced by a heat source, the unevenness of the temperature distribution in the stacking direction can be minimized. In this case, too, the structure of each solid electrolyte layer is the same as the above-described structure (Refer to FIG. 1). That is, the thickness of each solid electrolyte layer is larger at the center than at the periphery.

In the case where the temperature of the battery cell located at the outermost position on the side close to the heat source is highest among all the battery cells, that is, in the case where the heat radiation of this outermost battery cell is lowest among all the battery cells, the solid electrolyte layer in the outermost battery cell is preferably formed with the largest thickness.

Figure 7:
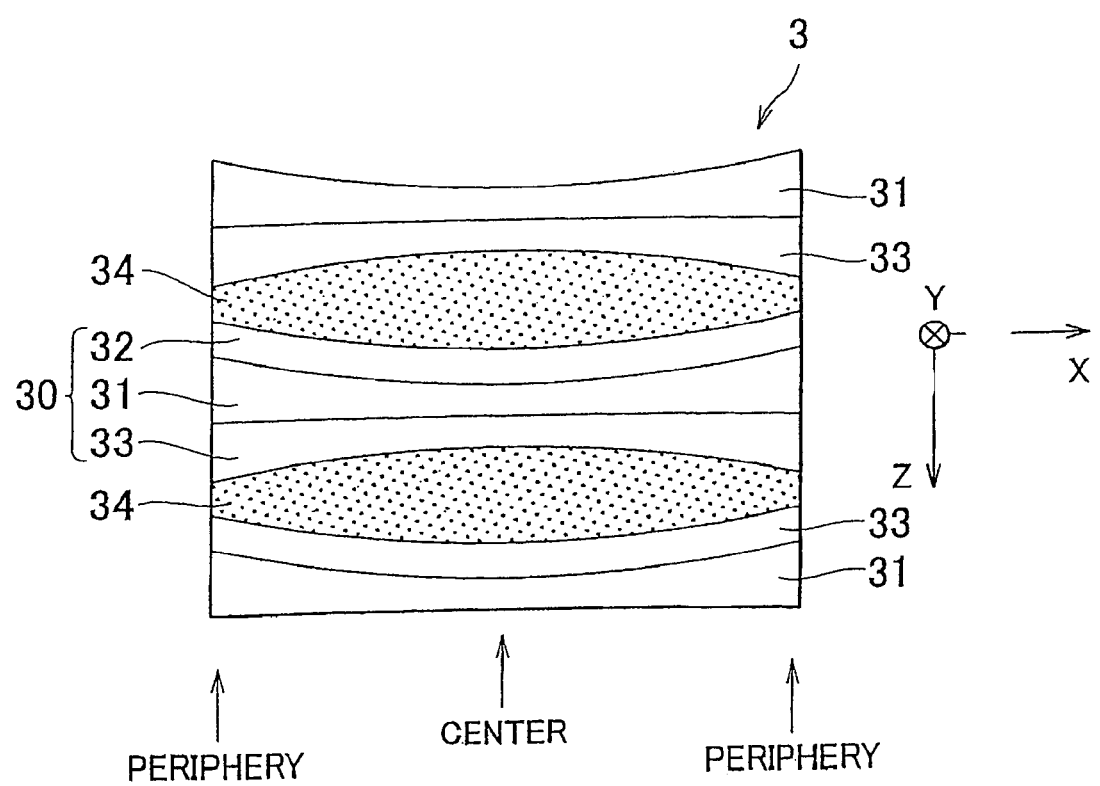
FIG. 7 is a cross-sectional view of a bipolar battery of another modification example of the first example embodiment.

Meanwhile, while the both sides of each current collecting portion 11 are curved (concaved) as shown in FIG. 1 in the first example embodiment, they may be formed otherwise. For example, as shown in FIG. 7, each current collecting portion 31 may be formed such that one side of the current collecting portion 31 in the stacking direction is generally flat (including production tolerances) and the other side is curved (concaved) so as to match the surface (curved surface) of the corresponding solid electrolyte layer 34. Note that the structure of the solid electrolyte layer 34 is the same as the structure of the solid electrolyte layer 14 shown in FIG. 1.

In the above case, more specifically, an electrode layer (one of the positive electrode layer and the negative electrode layer) 32 having a substantially uniform thickness is formed on the curved side of the current collecting portion 31 and an electrode layer (the other of the positive electrode layer and the negative electrode layer) 33 having a non-uniform thickness is formed on the flat side of the current collecting portion 11. That is, the electrode layer 33 has a generally flat face that contacts the current collecting portion 31 and a curved face (concave face) that contacts the solid electrolyte layer 34, and the thickness of the electrode layer 33 continuously increases from the center to the periphery. Note that the current collecting portion 31 and the electrode layers 32, 33 together form a bipolar electrode 30.

As such, in the structure shown in FIG. 7, too, the thickness of the solid electrolyte layer 34 varies according to the position in the X-Y plane, thus minimizing the unevenness of the temperature distribution in the X-Y plane. Further, in this structure, because the thickness of the current collecting portion 31 and the thickness of the electrode layer 33 (i.e., the thickness of the bipolar electrode 30) also vary according to the thickness of the solid electrolyte layer 34, the non-uniformity of thickness in the battery cell can be minimized. Namely, in each battery cell, the variation of the thickness of the solid electrolyte layer 34 is offset by the variation of the thickness of the current collecting portion 31 and the variation of the thickness of the electrode layer 33.

While the both sides of the solid electrolyte layer 14 (the sides that contact the electrode layers 12, 13, respectively) are curved (convexed) in the structure shown in FIG. 1, they may be formed otherwise. That is, one side of the solid electrolyte layer in the stacking direction may be curved (convexed) and the other side may be formed generally flat. In this case, too, the thickness of the solid electrolyte layer continuously increases from the periphery to the center, and thus the unevenness of the temperature distribution in the X-Y plane can be minimized.

In the above case, moreover, the side of the electrode layer that contacts the curved side (convexed side) of the solid electrolyte layer may be curved (concaved) and the other side of the electrode layer may be formed generally flat. That is, in the battery cell, the variation of the thickness of the solid electrolyte layer can be offset by the variation of the thickness of the electrode layer.

Further, the electrode layer that contacts the curved side (convexed side) of the solid electrolyte layer may be formed so as to have a substantially uniform thickness, and one side of the current collecting portion that contacts this electrode layer may be curved (concaved). That is, in the battery cell, the variation of the thickness of the solid electrolyte layer is offset by the variation of the thickness of the current collecting portion.

Figure 8:
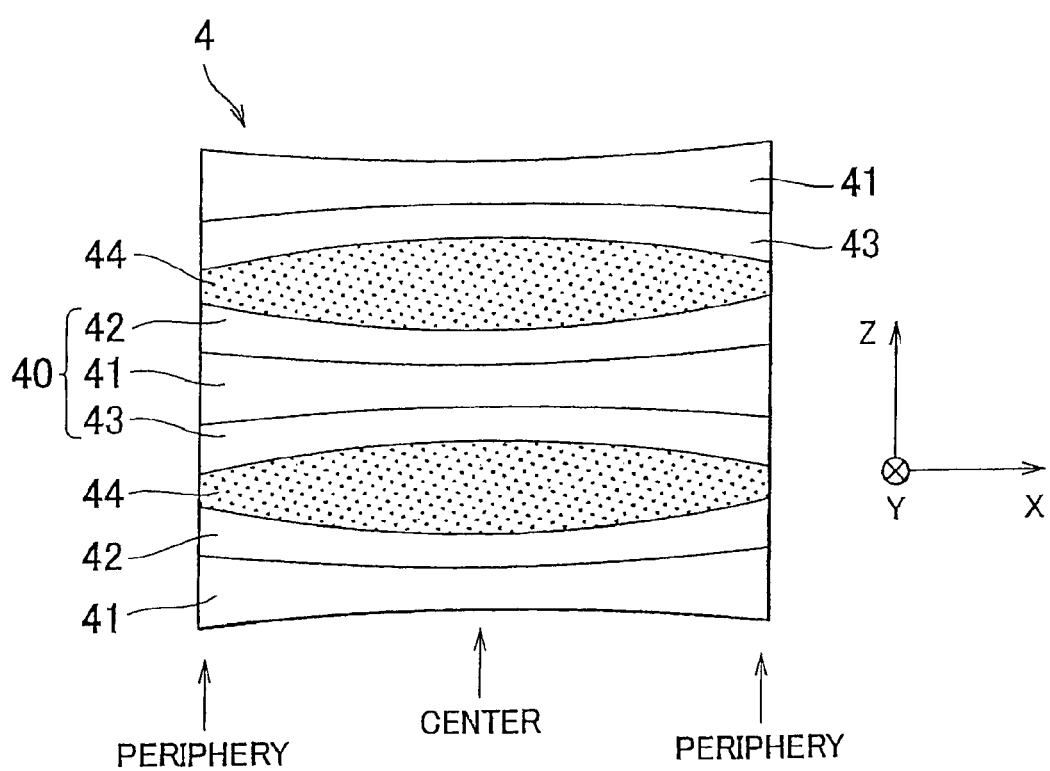
FIG. 8 is a cross-sectional view of a bipolar battery of still another modification example of the first example embodiment.

On the other hand, the bipolar battery (battery cell) may be structured as shown in FIG. 8. In the structure shown in FIG. 8, the thickness of the electrode layer 42, the thickness of the electrode layer 43, and the thickness of the current collecting portion 41 vary according to the position in the X-Y plane. Note that the structure of the solid electrolyte layer 44 is the same as the structure of the solid electrolyte layer 14 shown in FIG. 1 in which the thickness of the solid electrolyte layer continuously increases from the periphery to the center.

More specifically, the both sides of the current collecting portion 41 are curved (concaved) so that the thickness of the current collecting portion 41 continuously increases from the center to the periphery. Further, the both sides of each electrode layer 42, 43 are curved (concaved and convexed) so that the thickness of the electrolyte layer 42, 43 increases from the center to the periphery.

In the structure shown in FIG. 8, too, the thickness of the solid electrolyte layer 44 varies according to the position in the X-Y plane, and therefore the variation of the temperature distribution in the X-Y plane can be minimized. Further, in the structure shown in FIG. 8, the thickness of each electrolyte layer 42, 43 varies in accordance with the thickness of the solid electrolyte layer 44 (i.e., the thickness of the bipolar electrode 40), the non-uniformity of the thickness in the battery cell can be minimized.

Meanwhile, the thickness of the battery cell can be made substantially uniform by making the sum of the amount of variation of the thickness of each electrode layer 42, 43 and the amount of variation of the thickness of the current collecting portion 41 (i.e., the amount of variation of the thickness of the bipolar electrode 40) substantially equal to the amount of variation of the thickness of the solid electrolyte layer 44 (including production tolerances). The "amount of variation of the thickness" refers to the difference in thickness between two arbitrary points in the X-Y plane.

On the other hand, in the structure shown in FIG. 1, the curvature of the curved face of the solid electrolyte layer 14 on one side and the curvature of the curved face of the solid electrolyte layer 14 on the other side are substantially equal to each other. However, these curved faces may be formed with different curvatures. In this case, too, the thickness of the solid electrolyte layer continuously increases from the periphery to the center, and therefore the variation of the temperature distribution in the X-Y plane can be minimized.

In the above case, the surfaces of the positive and negative electrodes that contact the both sides of the solid electrolyte layer, respectively, have different curvatures.

The bipolar batteries (secondary batteries) recited above can be used as power storage devices for, for example, electric vehicles (EVs), hybrid vehicles (HEVs), and fuel cell vehicles (FCVs).

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. A power storage device comprising:
an electrolyte layer having a thickness; and
an electrode constituted of a current collecting portion and an electrode layer, the current collecting portion and the electrode layer having thicknesses, wherein
the thickness of the electrolyte layer is larger at a first position in a plane perpendicular to a stacking direction in which components of the power storage device are stacked than at a second position at which heat radiation is higher than at the first position, and
the thickness of the current collecting portion is smaller at a position corresponding to the first position than at a position corresponding to the second position.

2. The power storage device according to claim 1, wherein the difference between the thickness of the electrolyte layer at the first position and the thickness of the electrolyte layer at the second position is substantially equal to the difference between the thickness of the current collecting portion at the position corresponding to the first position and the thickness of the current collecting portion at the position corresponding to the second position.

3. The power storage device according to claim 1, wherein the thickness of the electrode layer at a position corresponding to the first position and the thickness of the electrode layer at a position corresponding to the second position are substantially equal to each other.

4. The power storage device according to claim 1, wherein the thickness of the electrode layer at a position corresponding to the first position is smaller than the thickness of the electrode layer at a position corresponding to the second position.

5. The power storage device according to claim 4, wherein the difference between the thickness of the electrolyte layer at the first position and the thickness of the electrolyte layer at the second position is substantially equal to the difference between the thickness of the electrode at the position corresponding to the first position and the thickness of the electrode at the position corresponding to the second position.

6. The power storage device according to claim 1, wherein the first position is a position corresponding to substantially a center of the electrolyte layer, and
the second position is a position corresponding to a periphery of the electrolyte layer.

7. The power storage device according to claim 1, wherein the thickness of the electrolyte layer continuously increases from the second position to the first position, and
the thickness of the current collecting portion continuously decreases from the second position to the first position.

8. The power storage device according to claim 7, wherein the thickness of the electrode layer continuously decreases from the second position to the first position.

9. The power storage device according to claim 1, wherein
the thickness of the electrolyte layer increases in steps from the second position to the first position, and
the thickness of the current collecting portion decreases in steps from the second position to the first position.

10. The power storage device according to claim 9, wherein the thickness of the electrode layer decreases in steps from the second position to the first position.

11. The power storage device according to claim 1, wherein the electrode layer has a region with no electrode layer in a plane perpendicular to the stacking direction.

12. The power storage device according to claim 11, wherein the electrolyte layer has a region with no electrolyte layer which is located at a position corresponding the region with no electrode layer.

13. The power storage device according to claim 1, wherein the electrode and the electrolyte layer are provided in plurality, and the plurality of electrodes are stacked in a manner such that a respective pair of the plurality of electrodes interposes one of the plurality of electrolyte layers therebetween.

14. The power storage device according to claim 13, wherein the thickness of at least one of the electrolyte layers is larger than the thickness of the other of the electrolyte layers.

* * * * *